United States Patent [19]

Ohkubo et al.

[11] Patent Number: 5,647,794
[45] Date of Patent: Jul. 15, 1997

[54] FAULT COMPENSATION METHOD AND FAULT COMPENSATION APPARATUS FOR AIR CONDITIONER

[75] Inventors: Masashi Ohkubo; Hideo Machida, both of Saitama-ken, Japan

[73] Assignee: Zexel Corporation, Tokyo-to, Japan

[21] Appl. No.: 650,181

[22] Filed: May 20, 1996

[30] Foreign Application Priority Data

May 25, 1995 [JP] Japan .................................... 7-126147
Apr. 25, 1996 [JP] Japan .................................... 8-105745

[51] Int. Cl.⁶ .................................................. B60H 1/00
[52] U.S. Cl. .................................................... 454/121
[58] Field of Search ........................... 454/75, 121, 124, 454/126, 127; 251/124.05

[56] References Cited

U.S. PATENT DOCUMENTS 4,591,773  5/1986  Numata ...................... 318/663
5,369,342  11/1994  Rudzewicz et al. ............ 318/102

*Primary Examiner*—Harold Joyce
*Attorney, Agent, or Firm*—Wolf, Greenfield & Sacks, P.C.

[57] ABSTRACT

When a fault occurs in the setting unit for setting the position of an actuator or when the control unit for controlling a stepping motor actuator goes out of order, the mode switch door cannot be set to a foot mode or the like other than a ventilation mode and a defrost mode. Therefore, when a fault occurs in the built-in contacts of the actuator for driving the mode switch door or when the control unit for controlling the stepping motor actuator for driving the mode switch door goes out of order, another mode position can be set by moving the actuator to a ventilation mode position or a defrost mode position and then reversing it with the moved position as a starting point.

14 Claims, 13 Drawing Sheets

FAULT COMPENSATION METHOD AND FAULT COMPENSATION APPARATUS FOR AIR CONDITIONER

BACKGROUND OF THE INVENTION

1. Field of the Invention

This invention relates to a fault compensation method for an air conditioner which is used when position setting contacts of an actuator for driving a mode switch door malfunction or when abnormality occurs in a control unit of the actuator and to a fault compensation apparatus for an air conditioner.

2. Description of the Prior Art

Generally speaking, an air conditioner ejects air whose temperature has been adjusted to an appropriate temperature by an air mix door from a ventilation air outlet at a downstream of a duct, a foot air outlet, a defrost air outlet and the like. In this case, a mode switch door is located at a downstream of the duct and controlled by an actuator. Its control modes are, for example, defrost, defrost/foot, foot, bilevel and ventilation modes. These modes are switched by a mode changing switch.

FIG. 12 shows an example of an actuator control system for controlling the above mode switch door disclosed in JP-A-63-2716 (the term "JP-A" as used herein means an "unexamined published Japanese patent application"), for example. In the figure, reference numeral 1 represents a control unit which has a microcomputer 2. A drive circuit 3 formed of a circuit for controlling normal and reverse rotations of a motor is controlled by the output of this microcomputer 2 and the output of the drive circuit 3 is supplied to a motor 5 which constitutes an actuator 4 for controlling a mode switch door.

Reference numeral 6 represents a mode changing switch which is provided on an air conditioner operation panel located near the dashboard of a car and which consists of a defrost switch 7, a defrost/foot switch 8, a foot switch 9, a bilevel switch 10 and ventilation switch 11. A mode setting signal corresponding to each of the switches 7 to 11 is applied to the microcomputer 2.

The above actuator 4, as shown in FIG. 11, controls the opening of the mode switch door 13 through a link unit or a gear unit 12. The mode switch door 13 consists of a door 13a for adjusting the amount of air blowing out from the foot air outlet F at a downstream of the duct and a door 13b for controlling the amount of air blowing out from upper and lower branch ducts D1 and D2 provided at an upper position of the downstream of the duct. In FIG. 11, MD represents an air mix door.

In FIG. 12, a setting unit 19 which comprises a ventilation mode setting contact 14, a bilevel mode setting contact 15, a foot mode setting contact 16, a defrost/foot mode setting contact 17 and a defrost mode setting contact 18 is provided in a casing constituting the actuator 4. As shown in FIG. 13, the contacts 14 to 18 are provided on an unshown output plain gear of the motor 5, for example, and formed by a movable contact 20 which rotates together with the output plain gear and fixed contacts 21 which are provided on the inside surface of the casing which faces the output plain gear. When the output gear turns with the rotation of the motor, the movable contact 20 also rotates and contacts one of the fixed contacts 21 to turn on the contact. Output from each of the contacts 14 to 18 is input into the microcomputer 2 through the input circuit 22. The fixed contact 21 of the above ventilation mode setting contact 14 corresponds to a position when the mode switch door 13 driven by the actuator is set to a ventilation mode, the fixed contact 21 of the bilevel mode setting contact 15 corresponds to a position when the mode switch door 13 is set to a bilevel mode, the fixed contact 21 of the foot mode setting contact 16 corresponds to a position when the mode switch door 13 is set to a foot mode, the fixed contact 21 of the defrost/foot mode setting contact 17 corresponds to a position when the mode switch door 13 is set to a defrost/foot mode, and the fixed contact 21 of the defrost mode setting contact 18 corresponds to a position when the mode switch door 13 is set to a defrost mode. In other words, the actuator turns within a section L between the position of the ventilation mode setting contact 14 and the position of the defrost mode setting contact 18 at both ends and stops at each of the contacts 14 to 18 while turning.

In the above constitution, when the defrost switch 7 is turned on, the microcomputer 2 turns the motor 5 of the actuator 4 in a defrost mode direction and the movable contact 20 rotates with the rotation of the motor 5. When the movable contact 20 contacts the fixed contact 21 of the defrost mode setting contact 18 (the defrost mode setting contact 18 is turned on), this ON signal is input into the microcomputer 2 through the input circuit 22 and the microcomputer 2 stops the motor 5. The mode switch door 13 is thereby set to a defrost mode (a mode for ejecting air from a defrost air outlet).

When the defrost/foot switch 8 is turned on, the microcomputer 2 turns the motor 5 in a defrost/foot mode direction and the movable contact 20 rotates with the rotation of the motor 5. When the movable contact 20 contacts the fixed contact 21 of the defrost/foot mode setting contact 17 (defrost/foot mode setting contact 17 is turned on), the ON signal is input into the microcomputer 2 through the input circuit 22 and the microcomputer 2 stops the motor 5. The mode switch door 13 is thereby set to a defrost/foot mode (a mode for ejecting air both from a defrost air outlet and a foot air outlet).

When the foot switch 9 is turned on, the microcomputer 2 turns the motor 5 in a foot mode direction and the movable contact 20 rotates with the rotation of the motor 5. When the movable contact 20 contacts the fixed contact 21 of the foot mode setting contact 16 (the foot mode setting contact 16 is turned on), this ON signal is input into the microcomputer 2 through the input circuit 22 and the microcomputer 2 stops the motor 5. The mode switch door 13 is thereby set to a foot mode (a mode for ejecting air from a foot air outlet).

When the bilevel switch 10 is turned on, the microcomputer 2 turns the motor 5 in a bilevel mode direction and the movable contact 20 rotates with the rotation of the motor 5. When the movable contact 20 contacts the fixed contact 21 of the bilevel mode setting contact 15 (the bilevel mode setting contact 15 is turned on), this ON signal is input into the microcomputer 2 through the input circuit 22 and the microcomputer 22 stops the motor 5. The mode switch door 13 is thereby set to a bilevel mode (a mode for ejecting air both from an ventilation air outlet and a foot air outlet).

When the ventilation switch 11 is turned on, the microcomputer 2 turns the motor 5 in a ventilation mode direction and the movable contact 20 rotates with the rotation of the motor 5. When the movable contact 20 contacts the fixed contact 21 of the ventilation mode setting contact 14 (the ventilation mode setting contact 14 is turned on), this ON signal is input into the microcomputer 2 through the input circuit 22 and the microcomputer stops the motor 5. The mode switch door 13 is thereby set to a ventilation mode (a mode for ejecting air from a ventilation air outlet).

However, according to the above constitution, when foreign matters in the casing adhere to the surface of the fixed contact 21 or the surface of the movable contact 20 or when a contact fault occurs, an ON signal from the mode setting contact cannot be obtained. As the result, the actuator 4 malfunctions and such a trouble that a foot mode cannot be obtained in winter occurs.

To eliminate the above trouble, in the conventional air conditioner, as shown in FIG. 14, when it is judged that the actuator 4 of the mode switch door 13 is out of order and either one of the defrost mode setting contact 18, the defrost/foot mode setting contact 17, and the foot mode setting contact 16 is turned on, the mode switch door 13 is automatically set to a defrost mode, and when either one of the ventilation mode setting contact 14 and the bilevel mode setting contact 15 is turned on, the mode switch door 13 is automatically set to a ventilation mode, thereby insuring the minimum air conditioning power.

To set a ventilation mode when the contacts of the actuator 4 are out of order, when the actuator 4 is kept turning in a ventilation mode direction (counterclockwise) for a predetermined time in FIG. 13, the mode switch door contacts the wall of an unshown duct, thereby stopping the actuator 4 at a ventilation mode position.

To set a defrost mode when the contacts of the actuator 4 are out of order, when the actuator 4 is kept turning in a defrost mode direction (clockwise) for a predetermined time in FIG. 13, the mode switch door 13 contacts the wall on the opposite side of the above unshown duct, thereby stopping the actuator 4 at a defrost mode position.

A stepping motor actuator having no setting unit 19 which comprises the contacts of the actuator 4 as shown in FIGS. 12 and 13 may be used as the actuator. When such a stepping motor actuator is used to control the mode switch door 13, the control unit does not require a circuit corresponding to the input circuit 22 as shown in FIG. 12. For instance, the amount of rotation of the stepping motor actuator is controlled by controlling the drive circuit with the microcomputer, whereby the position of the mode switch door 13 is controlled.

However, when the actuator 4 having the setting unit 19 comprising contacts is used, air conditioning in a ventilation mode or a defrost mode can be achieved in the case that the contacts 14 to 18 are out of order. However, other modes, i.e., bilevel mode, foot mode and defrost/foot mode, cannot be obtained, leaving an uncomfortable feel from the air conditioning.

When a stepping motor actuator is used as the actuator, it is impossible to control the position of the mode switch door if some abnormality occurs in the control unit for controlling the stepping motor actuator.

SUMMARY OF THE INVENTION

It is therefore an object of the present invention to set an appropriate air conditioning mode even when the contacts of a setting unit of an actuator having contacts go out of order or when abnormality occurs in the control unit of a stepping motor actuator.

In a first fault compensation method according to the present invention, at the time of the malfunctioning of the setting unit of the actuator, another mode position can be set by moving the actuator to a ventilation mode position or a defrost mode position and reversing the actuator for a predetermined time with the moved position as a starting point.

In a second fault compensation method according to the present invention, at the time of the malfunctioning of the setting unit of the actuator, when the defrost switch is operated, the actuator is moved to a defrost mode position, when the foot switch is operated, the actuator is moved to a foot mode position and reversed in a certain section, when the defrost/foot switch is operated, the actuator is moved to a defrost mode position and then reversed in a section shorter than the section when the foot switch is operated, when a ventilation switch is operated, the actuator is moved to a ventilation mode position, and when a bilevel switch is operated the actuator is moved to a ventilation mode position and then reversed in a certain section.

In a third fault compensation method according to the present invention, reversing time is set in advance according to the drive voltage of the motor of the actuator so that the actuator is reversed for this reversing time.

Further, in a fourth fault compensation method according to the present invention, when a stepping motor actuator is used as an actuator, the first fault compensation method is carried out if the control unit of the stepping motor actuator is out of order.

In a fifth fault compensation method according to the present invention, when a stepping motor actuator is used as an actuator, the second fault compensation method is carried out if the control unit of the stepping motor actuator is out of order.

A first fault compensation apparatus according to the present invention comprises drive means for driving the above stepping motor actuator, fault detection means for detecting a fault in the control unit and a control unit having compensation processing means and practices the above fourth fault compensation method with this compensation processing means.

A second fault compensation apparatus according to the present invention has compensation processing means for practicing the above fifth fault compensation method in the control unit.

The above fault compensation means is formed of a microcomputer.

The above control unit has a microcomputer which instructs normal or reverse rotation of the above stepping motor actuator and the above compensation processing means is formed of an arithmetic processing unit for controlling the drive means based on an instruction from the microcomputer.

The above and other objects, features and advantages of the invention will become more apparent from the following description when taken in conjunction with the accompanying drawings.

DESCRIPTION OF THE PREFERRED EMBODIMENT

Embodiment 1

Figure 1:
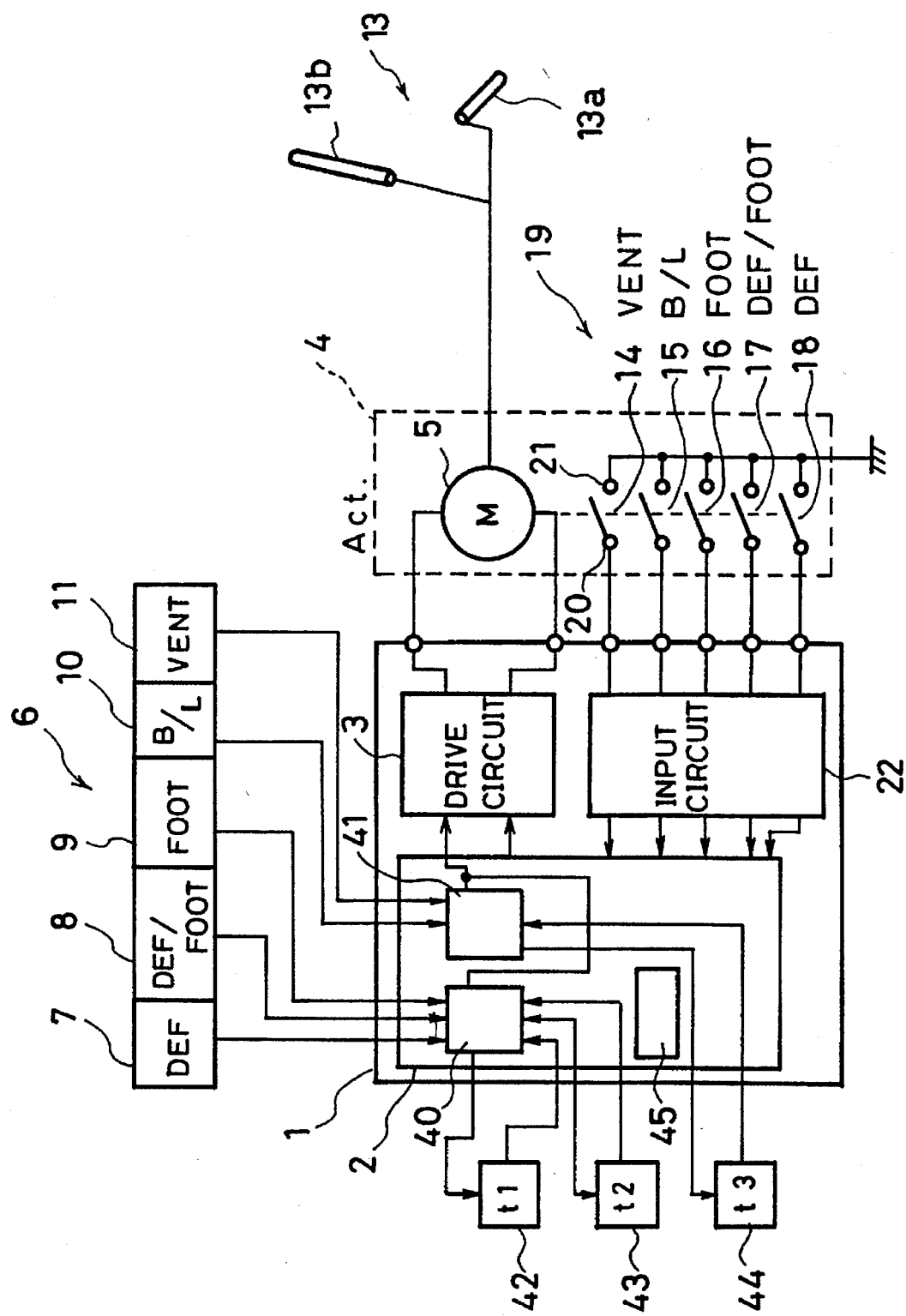
FIG. 1 is a block diagram of a first embodiment of the present invention.
Figure 2:
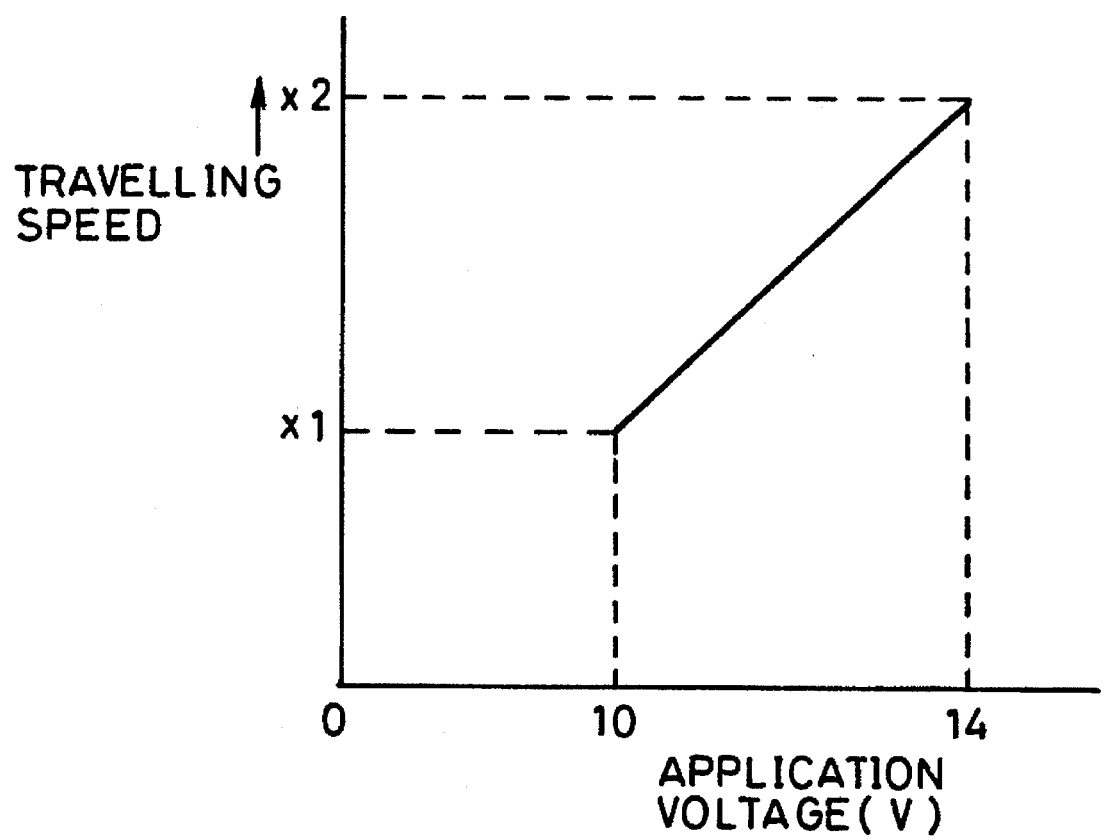
FIG. 2 is a characteristic diagram for explaining the first embodiment of the present invention.
Figure 12:
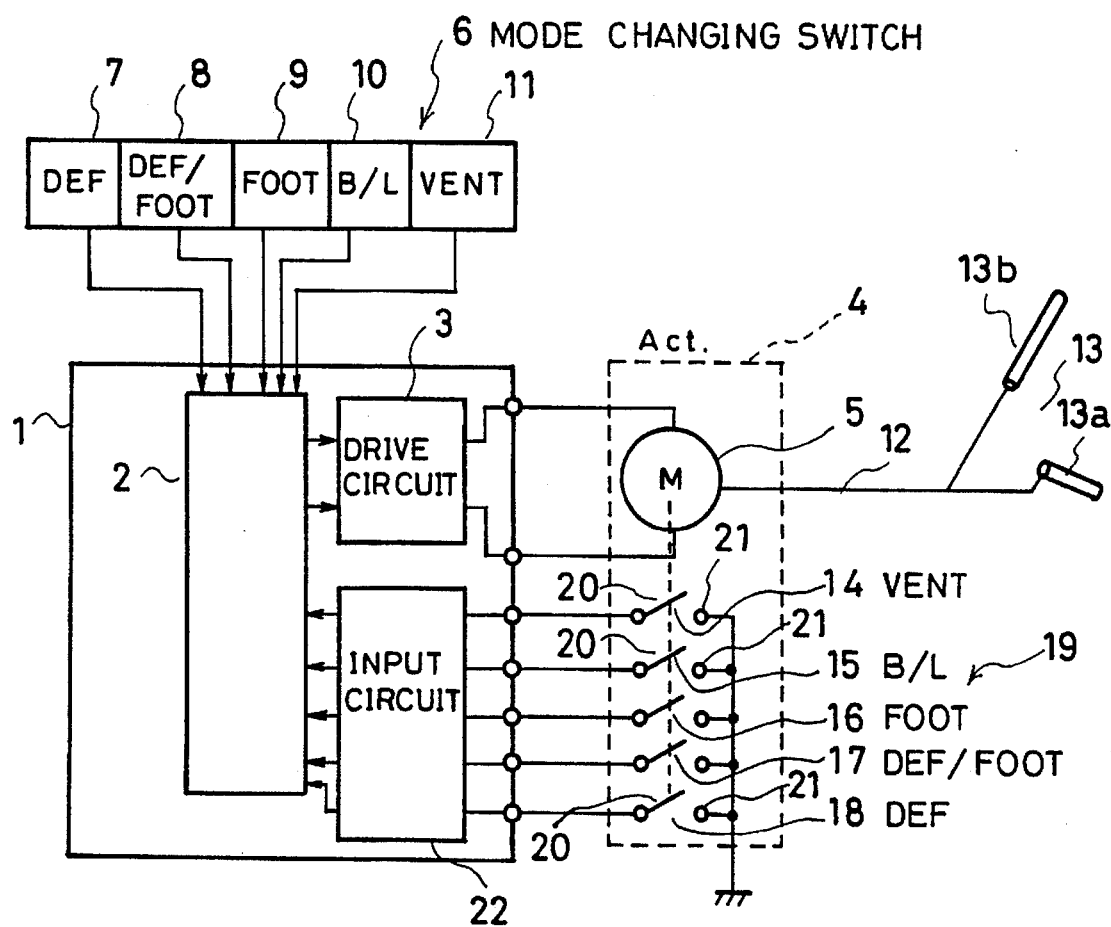
FIG. 12 is a block diagram showing an example of an air conditioner fault compensation method of the prior art.
Figure 13:
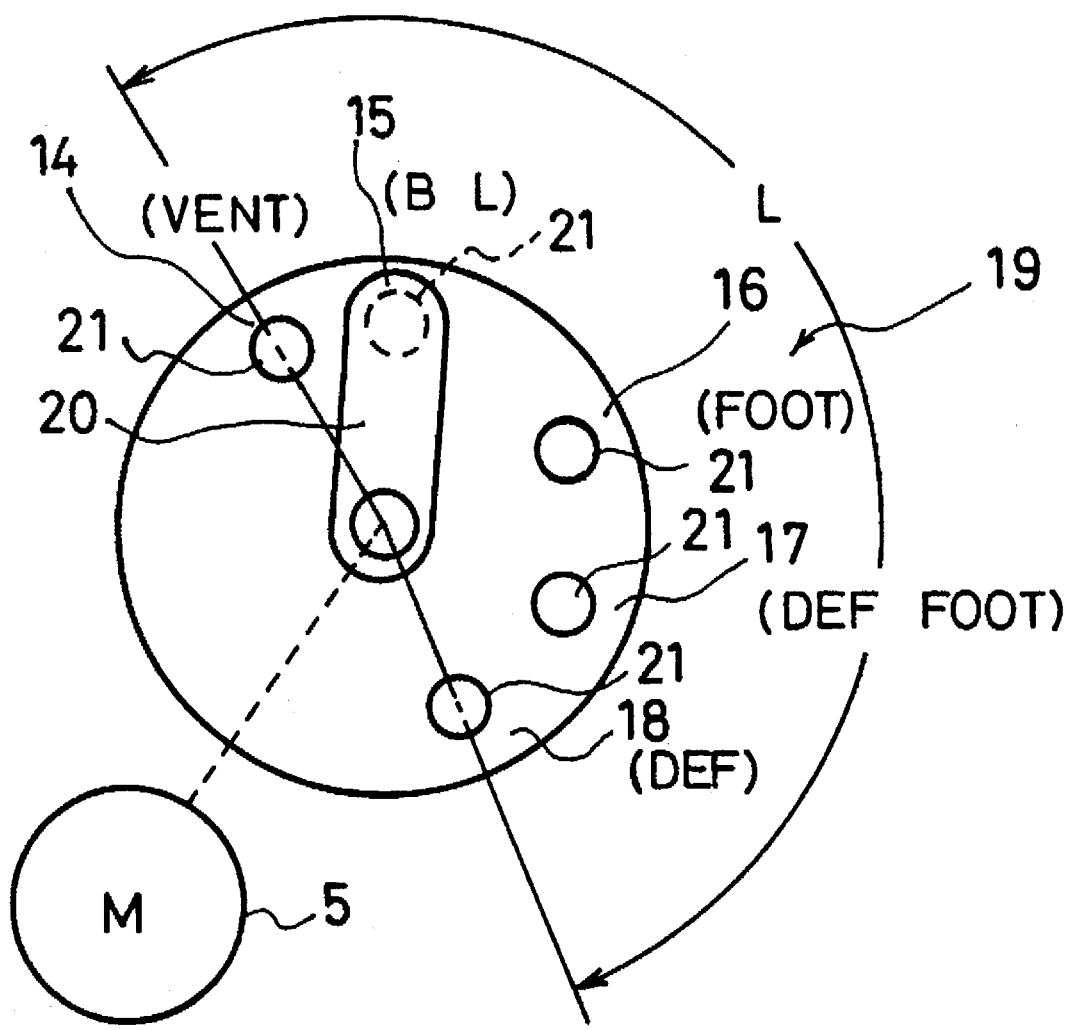
FIG. 13 is a structural diagram showing the operation of FIG. 12.
Figure 14:
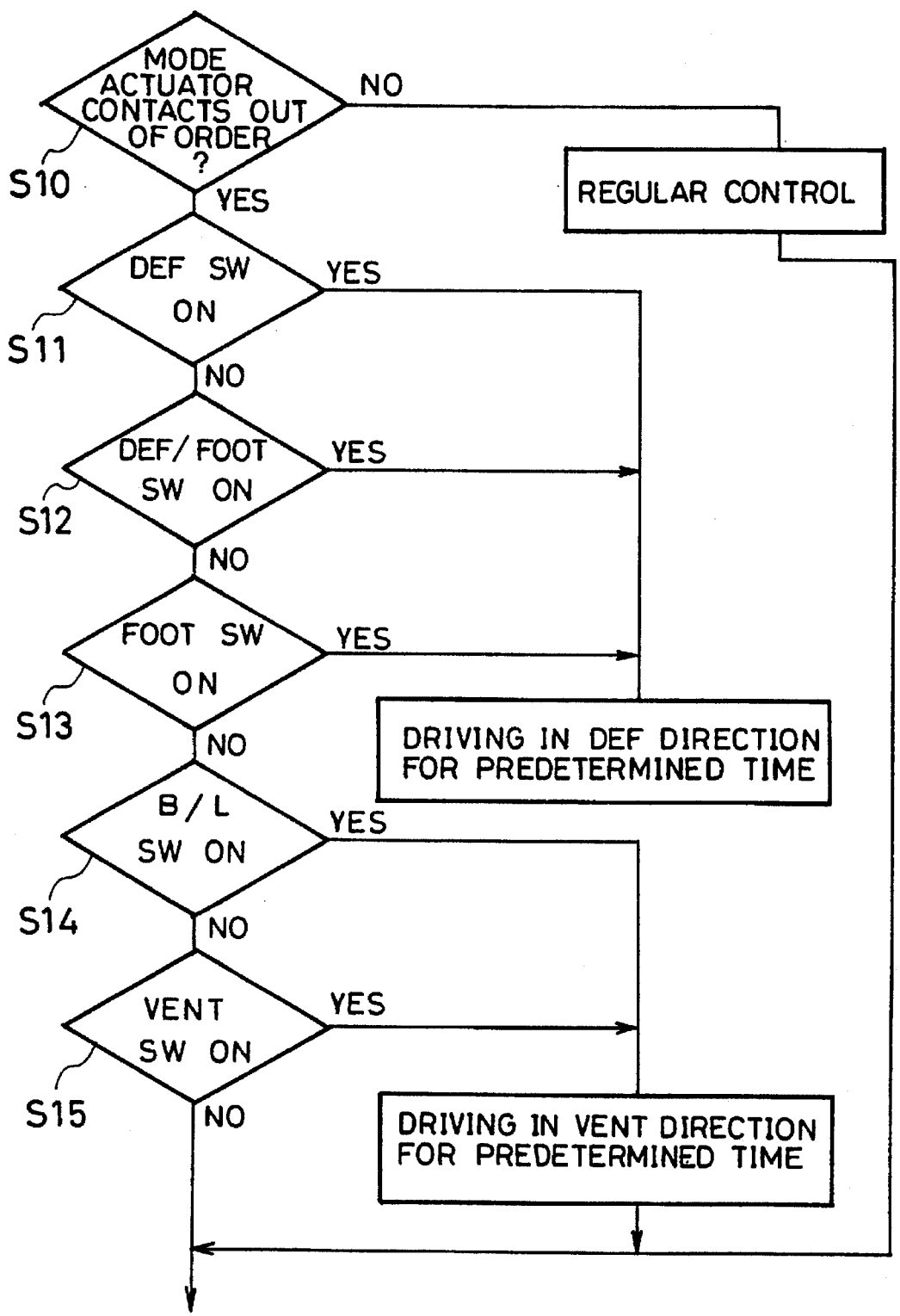
FIG. 14 is a flow chart showing the operation of FIG. 12.

FIG. 1 is a block diagram of a fault compensation method for an air conditioner according to a first embodiment of the present invention. The same reference numerals of FIG. 12 are given to the same or corresponding parts. In FIG. 1, reference numeral 40 represents defrost mode setting means, 41 ventilation mode setting means and 42 to 45 timers. Reference numeral 45 represents a contact fault detection circuit which determines that the actuator 4 is out of order when an ON signal is not obtained from one of the contacts 14 to 18 specified by the mode changing switch 6 within a specified time period. The timers 42, 43 and 44 generate a time-up signal when times t1, t2 and t3 elapse after the start of operation, respectively. T1 is the time required until the actuator 4 reaches a defrost/foot mode position from a defrost mode position, t2 the time required until the actuator 4 reaches a foot mode position from a defrost mode position and t3 the time required until the actuator 4 reaches a bilevel mode position from a ventilation mode position. As shown in FIG. 2, these times are determined according to the travelling speed of the actuator which is determined according to voltage applied to the motor 5 of the actuator 4 and the moving distance of the actuator (distance from a defrost mode position to a defrost/foot mode position, distance from a defrost mode position to a foot mode position or distance from a ventilation mode position to a bilevel mode position). As shown in FIG. 2, it is known that the traveling speed of the actuator from x1 to x2 increases as voltage applied to the motor 5 rises. Therefore, this travelling speed can be detected easily by obtaining voltage applied to the motor 5.

When the defrost switch 7 is turned on, the defrost setting means 40 controls the actuator 4 based on a signal from the defrost switch 7 to set the mode switch door 13 to a defrost mode in which the defrost air outlet is opened. When the defrost/foot switch 8 is turned on, this defrost setting means 40 controls the motor 5 based on a signal from the defrost/foot switch 8 to set the mode switch door 13 to a defrost mode and then starts the timer 42 to reverse the motor 5 from the defrost mode only for a time t1 set by the timer 42. The actuator 4 is thereby set to a defrost/foot mode.

When the foot switch 9 is turned on, this defrost setting means 40 controls the motor 5 based on a signal from the foot switch 9 to set the mode switch door 13 to a defrost mode and then starts the timer 43 to reverse the motor 5 from the defrost mode only for a time t2 set by this timer 43. The actuator 4 is thereby set to a foot mode.

When the ventilation switch 11 is turned on, the ventilation mode setting means 41 controls the actuator 4 based on a signal from this ventilation switch 11 to set the mode switch door 13 to a ventilation mode in which the ventilation air outlet is opened. When the bilevel switch 10 is turned on, the ventilation mode setting means 41 controls the motor 5 based on a signal from this bilevel switch 10 to set the mode switch door 13 to a ventilation mode and then starts the timer 44 to reverse the motor 5 from the ventilation mode only for a time t3 set by the timer 44. The mode switch door 13 is thereby set to a bilevel mode.

Figure 3:
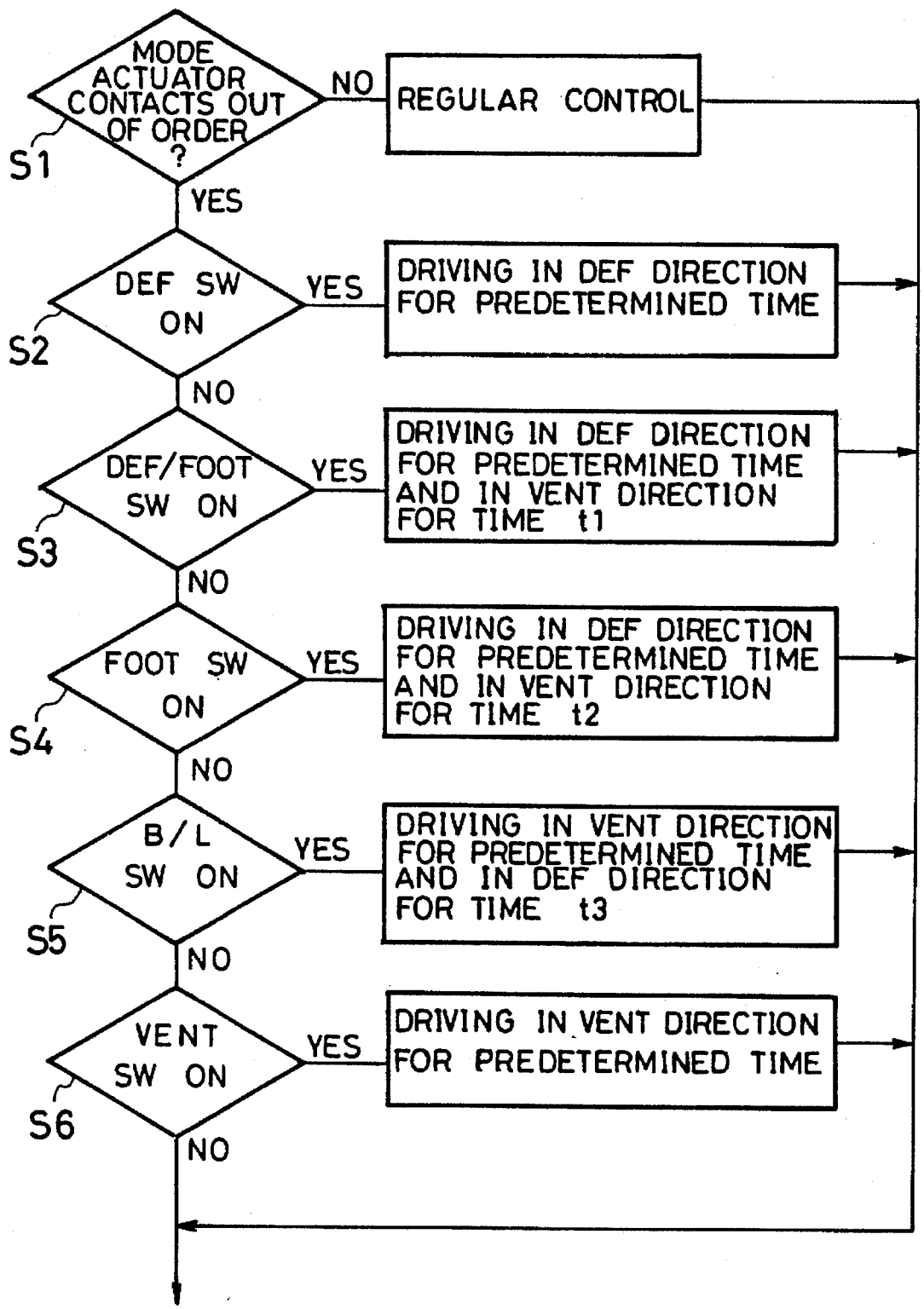
FIG. 3 is a flow chart for explaining the operation of the first embodiment of the present invention.

In the above constitution, a description is given of the operation of the air conditioner fault compensation method of the present invention with reference to FIG. 3.

In step S1, when the contact fault detection circuit 45 judges that the actuator 4 is not out of order, regular control is carried out. The mode switch door 13 is set to either one of defrost mode, defrost/foot mode, foot mode, bilevel mode and ventilation mode according to the operation of the mode changing switch 6.

When the contact fault detection circuit 45 judges that the actuator 4 is out of order, the routine proceeds to step S2. In step S2, when the defrost switch 7 is turned on, the mode switch door 13 is driven in a defrost direction for a predetermined time and set to a defrost mode according to the operation of the defrost setting means 40.

In step S2, when the defrost switch 7 is not turned on, the routine proceeds to step S3. In step S3, when the defrost/foot switch 8 is turned on, the defrost setting means 40 sets the mode switch door 13 to a defrost position and start the timer 42 to reverse the motor 5 in a ventilation direction only for a time t1 set by the timer 42 (until the timer 42 generates a time-up signal). Thus, the mode switch door 13 is set to a defrost/foot mode.

In step S3, when the defrost/foot switch 8 is not turned on, the routine proceeds to step S4. In step S4, when the foot switch 9 is turned on, the defrost setting means 40 sets the mode switch door 13 to a defrost position and starts the timer 43 to reverse the motor 5 in a ventilation direction only for a time t2 set by the timer 43 (until the timer 43 generates a time-up signal). Thus, the mode switch door 13 is set to a foot mode.

In step S4, when the foot switch 9 is not turned on, the routine proceeds to step S5. In step S5, when the bilevel switch 10 is turned on, the ventilation mode setting means 41 sets the mode switch door 13 to a ventilation position and starts the timer 44 to reverse the motor 5 in a ventilation direction only for a time t2 set by the timer 44 (until the timer 44 generates a time-up signal). Thus, the mode switch door 13 is set to a bilevel mode.

In step S5, when the bilevel switch 10 is not turned on, the routine proceeds to step S6. In step S6, when the ventilation switch 11 is turned on, the mode switch door 13 is set to a ventilation mode position.

In this first embodiment of the present invention, the defrost mode setting means 40 and the ventilation mode setting means 41 can be implemented by a CPU which receives a fault detection output from the contact fault detection circuit 45 to start the timers 42, 43 and 44 and executes a processing program for controlling the drive circuit 3 based on the timers as shown in the processing flow of FIG. 3.

According to the first embodiment of the present invention, even when the setting unit 19 of the actuator 4 having the setting unit 19 including contacts malfunctions, the mode switch door 13 can be set to a desired mode. Therefore, an appropriate air conditioning mode can be obtained.

Embodiment 2

Figure 5:
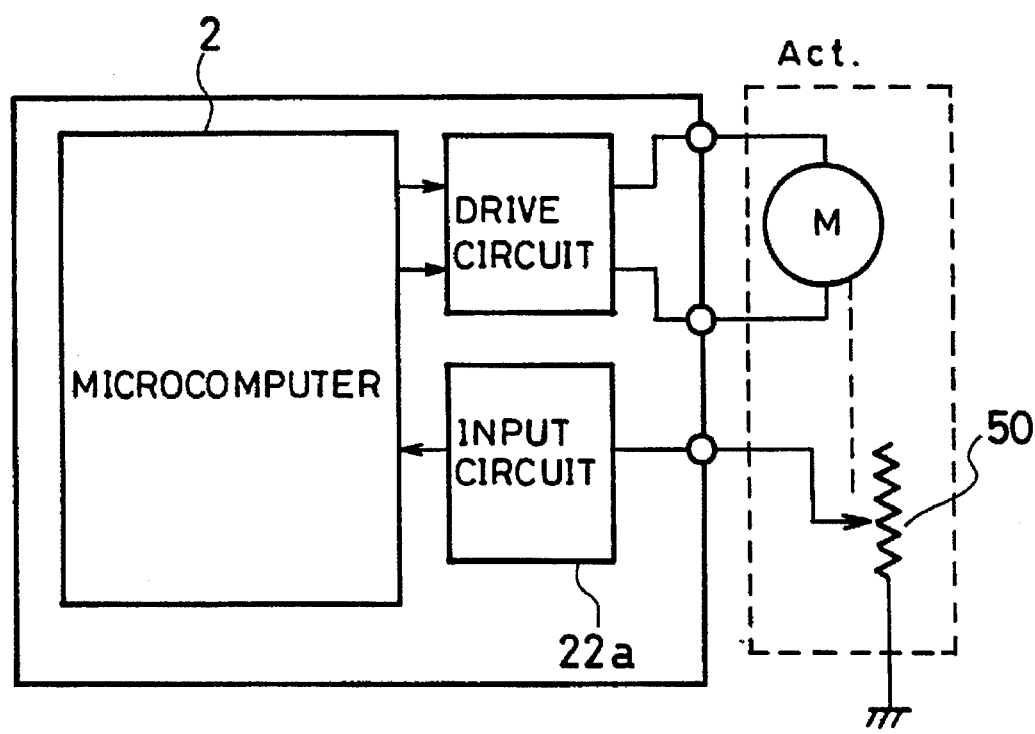
FIG. 5 is a block diagram of a second embodiment of the present invention.

The present invention can be applied to a control type air conditioner having a variable resistor 50 coupled to a motor as shown in FIG. 5. A resistance value signal from the variable resistor 50 as a setting unit is applied to the microcomputer 2 through an input circuit 22a and compared with a reference value which has been respectively set according to ventilation mode, bilevel mode, foot mode, defrost/foot mode and defrost mode positions, and the motor is stopped when the above resistance value signal is equal to the reference value. The same effect as that of the above first embodiment of the present invention can be obtained.

Figure 4:
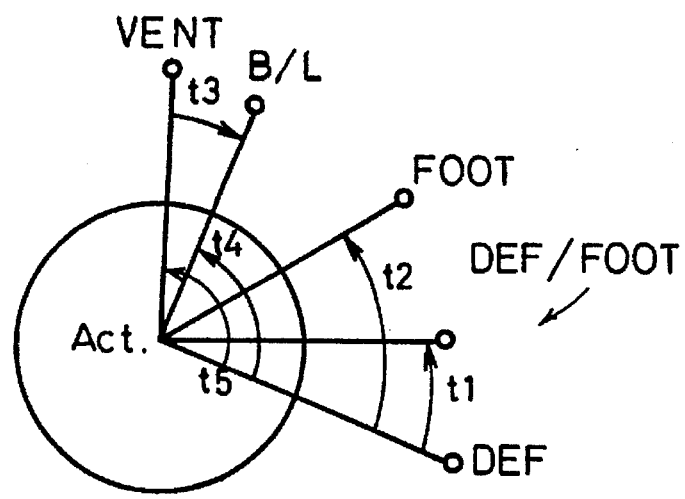
FIG. 4 is a diagram showing the operational state of an actuator in the first embodiment of the present invention.

In FIG. 4, to set a ventilation mode position and a bilevel mode position, the actuator may be reversed only for times t4 and t5 with a defrost mode position as a starting point, respectively. On the contrary, to set a foot mode, defrost/foot mode and defrost mode positions, the actuator may be reversed only for a respective predetermined time with a ventilation mode position as a starting point.

Embodiment 3

A description is given of another embodiment of the present invention in which a stepping motor actuator is used as an actuator.

Figure 6:
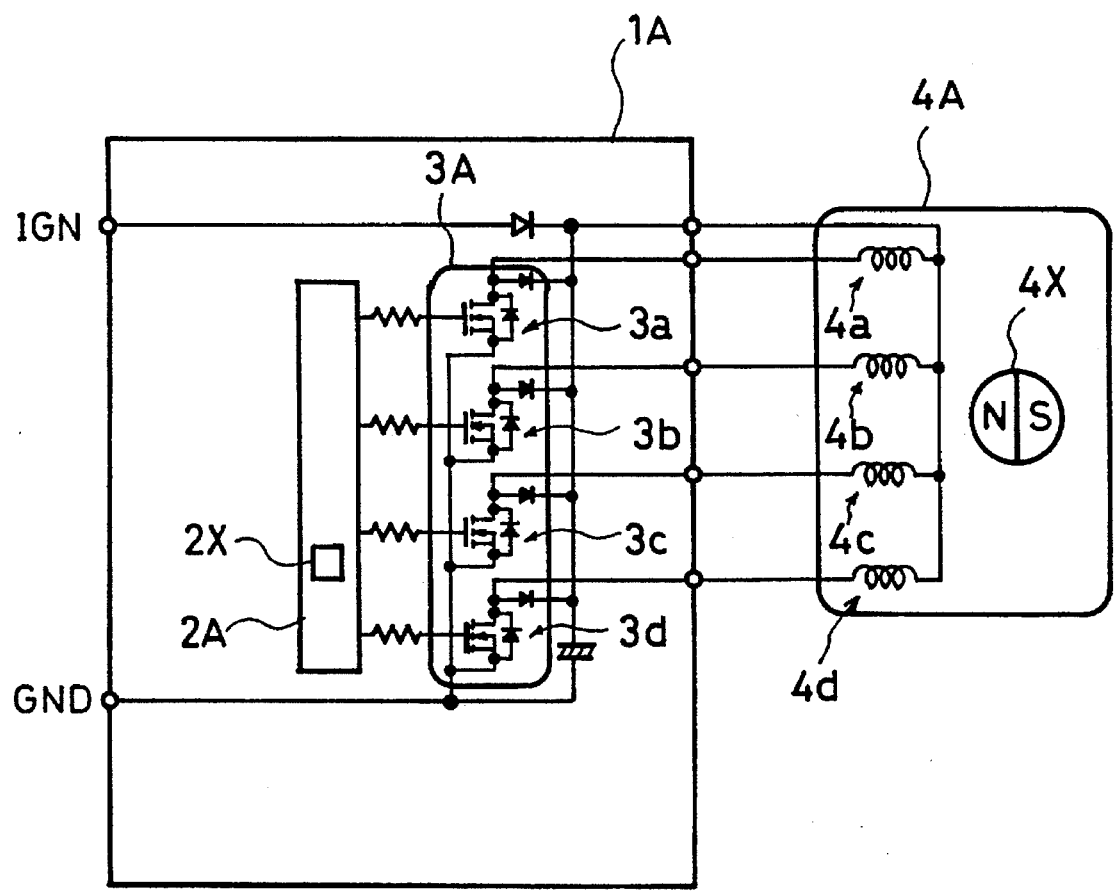
FIG. 6 is a block diagram of a third embodiment of the present invention.
Figure 11:
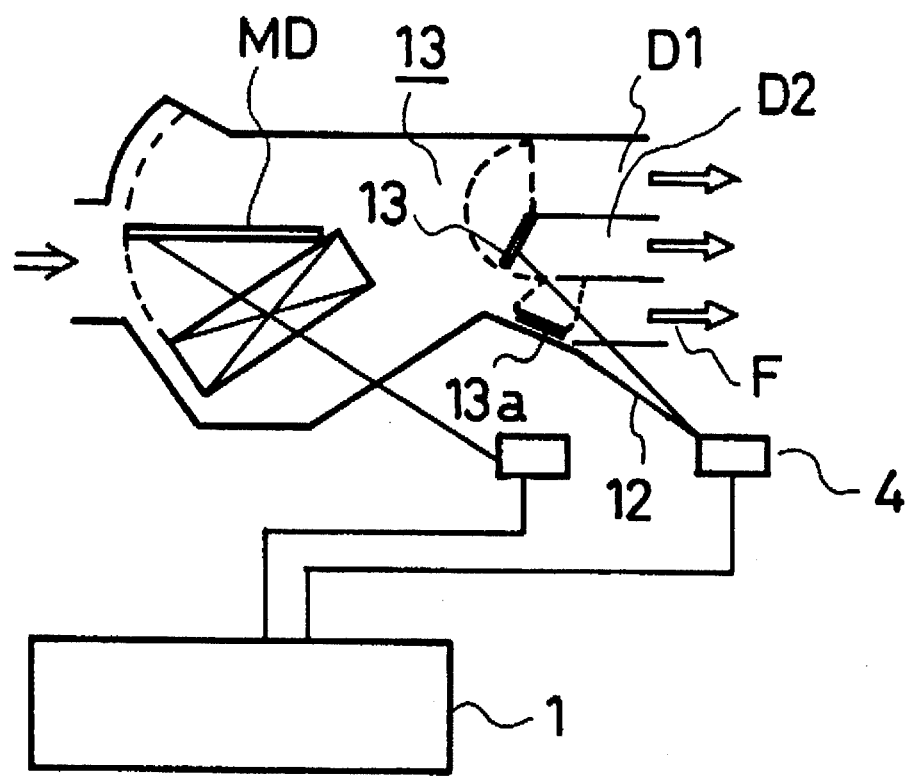
FIG. 11 is a diagram showing a general example of an air conditioner.

As shown in FIG. 6, when a stepping motor actuator 4A is used as an actuator, the stepping motor actuator 4A is controlled by a control unit 1A having a microcomputer 2A including abnormality detection means 2X and a drive circuit 3A consisting of switching FETs. The mode switch door 13 (consisting of doors 13a and 13b) is connected to a rotor 4X equivalent to the motor shaft of the stepping motor actuator 4A through a link unit or a gear unit 12 as shown in FIG. 11. The microcomputer 2A receives a mode instruction from the mode changing switch 6, controls the switching FETs 3a, 3b, 3c and 3d of the drive circuit 3A (four in FIG. 6, as an example), and generates pulses to poles 4a, 4b, 4c and 4d (four in FIG. 6, as an example) connected to the switching FETs to magnetize these poles so as to turn the rotor 4X. To turn the rotor 4X normally, the poles 4a, 4b, 4c and 4d may be magnetized in the order named and to turn the rotor 4X reversely, the poles may be magnetized in the opposite order. The rotation angle of the rotor 4X is determined by the number of output pulses (the number of magnetized poles or the number of magnetized pole phases). Although not directly related to this third embodiment of the present invention, the rotation speed of the rotor 4X is determined by the frequency of output pulses (i.e., a period from a time when one switching transistor is controlled to a time when the next switching transistor is controlled).

The microcomputer 2A has a mode position memory (register) and carries out control in the following manner under normal conditions. The microcomputer 2A knows how many pulses should be output to the stepping motor actuator 4A to drive the mode switch door 13 from a defrost mode position (or a ventilation mode position) to another mode position by turning the rotor 4X. For instance, to turn the rotor 4X from a DEF position to a FOOT position in FIG. 4, a FET 3a is first controlled to magnetize a pole 4a, and then a FET 3b is controlled to magnetize a pole 4b. In this way, when two pulses are necessary, the microcomputer 2A stores this information as FOOT mode=2. When the rotor 4X is set to a FOOT position according to a FOOT mode setting instruction, "2", the number of output pulses, is stored in the above mode position memory. Thereafter, when a VENT mode setting instruction is received from the mode changing switch 6, the microcomputer 2A calculates 4-2 (the previous value stored in the mode position memory, i.e., position information) to turn the rotor 4X so that the mode switch door can move from a FOOT mode position to a VENT mode position, and outputs one pulse to each of poles c and d, two in total, to turn the rotor 4X and move the mode switch door 13 from a FOOT mode position to a VENT mode position because the microcomputer 2A stores information that four pulses are necessary to shift from a DEF mode position to a VENT mode position as VENT mode=4. Therefore, the position of the mode switch door can be controlled by renewing a value stored in the mode position memory sequentially and calculating in the above manner. In the above case, shift from DEF to VENT has been shown. However, in the case of shift from VENT to FOOT, the rotor 4A must be reversed. In this case, the calculation is (2-4)= -2, from which it is understood that reverse rotation is necessary.

Figure 7:
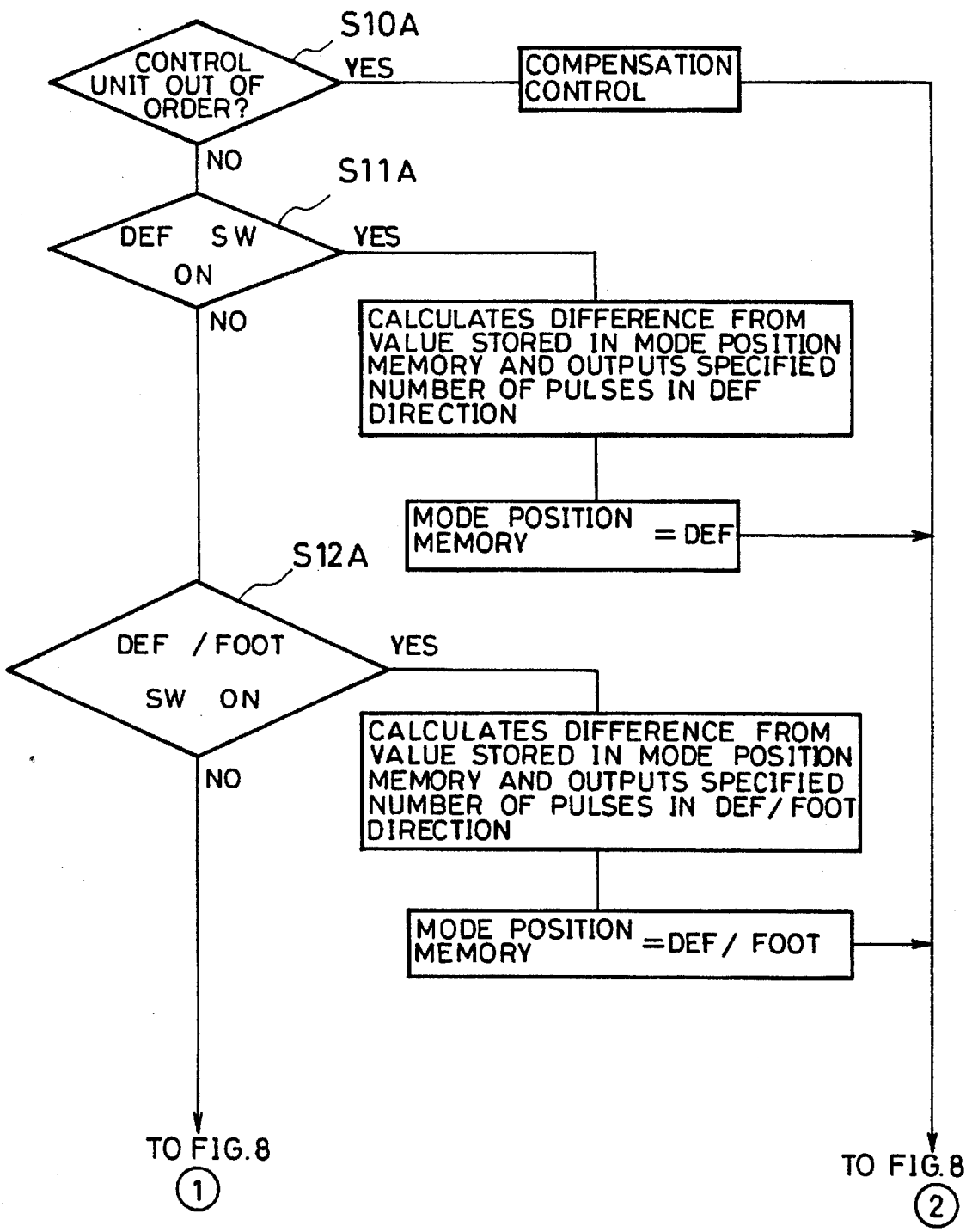
FIG. 7 is a flow chart for explaining the operation of the third embodiment of the present invention.
Figure 8:
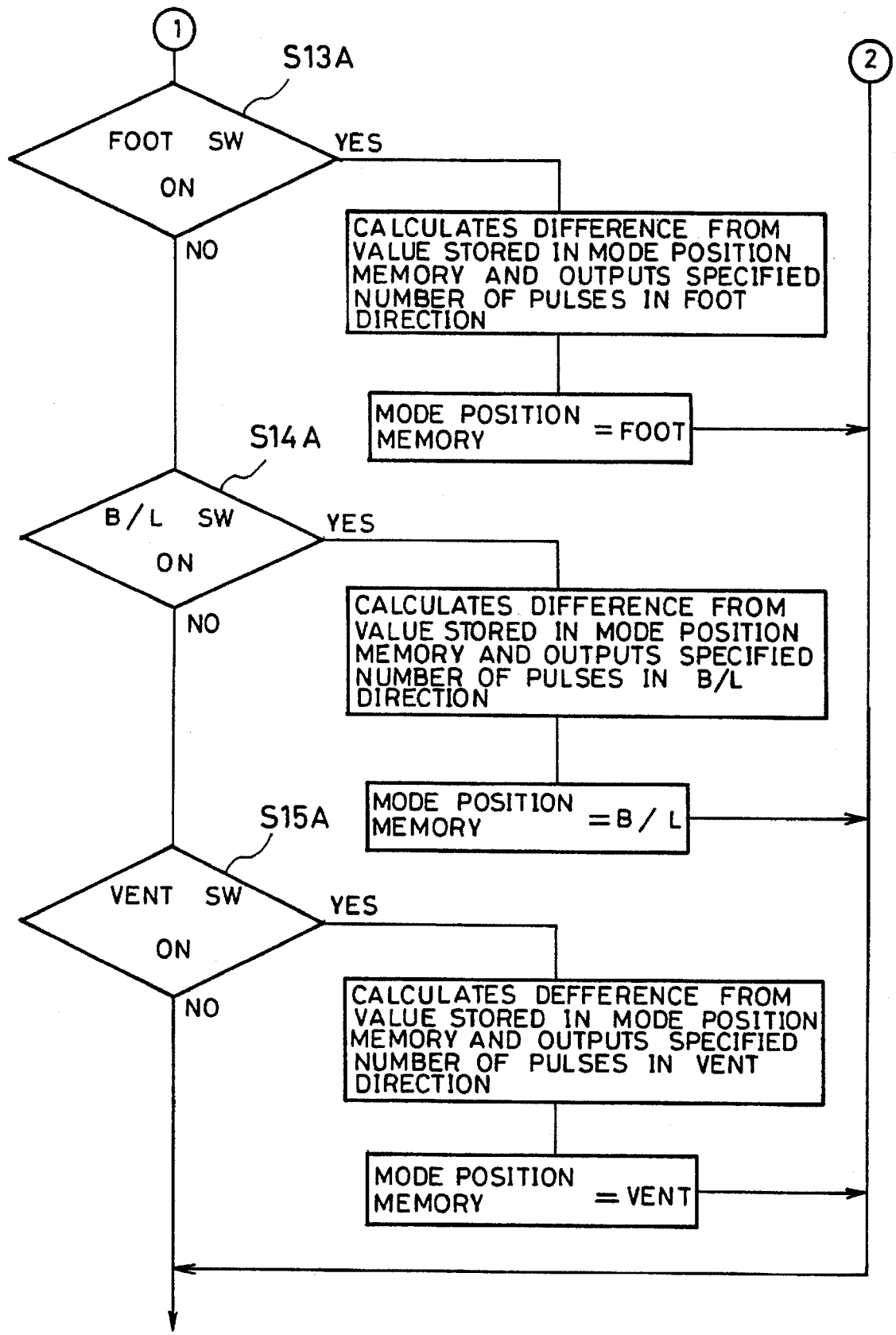
FIG. 8 is a flow chart for explaining the operation of the third embodiment of the present invention.

A description is subsequently given of detailed processing (CPU processing of the microcomputer 2A) under normal conditions when the control unit operates properly with reference to FIGS. 7 and 8.

Figure 9:
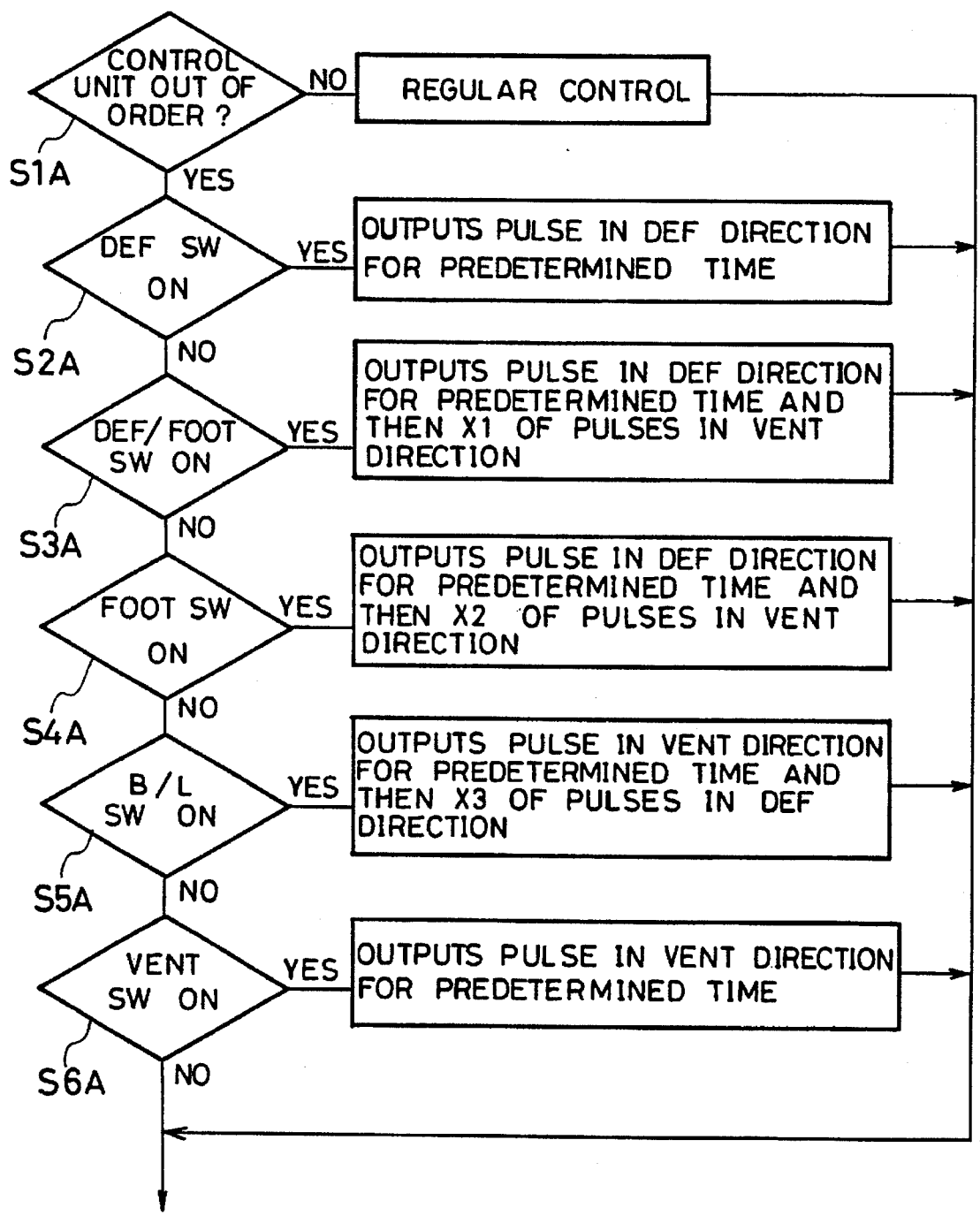
FIG. 9 is a flow chart for explaining the operation of the third embodiment of the present invention.

In step S10A, it is judged whether or not a control unit 1A for controlling the stepping motor actuator 4A is out of order. When it is judged that the control unit 1A is out of order, the routine proceeds to compensation control as shown in FIG. 9 to be described hereinafter.

When it is judged that the control unit 1A is not out of order, i.e., in order, the routine proceeds to regular control, that is, steps S10A to S15A. In step S11A, it is judged whether or not the defrost switch 7 is turned on. When it is turned on, a difference from the value stored in the mode position memory at the time of the previous mode setting is obtained and a specified number of pulses are output to the drive circuit 3A to drive the mode switch door 13 in a defrost direction. Thus, the mode switch door 13 is set to a defrost mode and DEF position information is stored in the mode position memory.

When the defrost switch 7 is not turned on, the routine proceeds to step S12A. In step S12A, it is judged whether or not the defrost/foot switch 8 is turned on. When it is turned on, a difference from the value stored in the mode position memory at the time of the previous mode setting is obtained and a specified number of pulses are output to the drive circuit 3A to drive the mode switch door 13 in a defrost/foot direction. Thus, the mode switch door 13 is set to a defrost/foot mode and DEF/FOOT position information is stored in the mode position memory.

When the defrost/foot switch 8 is not turned on, the routine proceeds to step S13A. In step S13A, it is judged whether or not the foot switch 9 is turned on. When it is turned on, a difference from the value stored in the mode position memory at the time of the previous mode setting is obtained and a specified number of pulses are output to the drive circuit 3A to drive the mode switch door 13 in a foot direction. Thus, the mode switch door 13 is set to a foot mode and FOOT position information is stored in the mode position memory.

When the foot switch 9 is not turned on, the routine proceeds to step S14A. In step S14A, it is judged whether or not the bilevel switch 10 is turned on. When it is turned on, a difference from the value stored in the mode position memory at the time of the previous mode setting is obtained and a specified number of pulses are output to the drive circuit 3A to drive the mode switch door 13 in a bilevel direction. Thus, the mode switch door 13 is set to a bilevel mode and B/L position information is stored in the mode position memory.

When the bilevel switch is not turned on, the routine proceeds to step S15A. In step S15A, it is judged whether or not the ventilation switch 11 is turned on. When it is turned on, a difference from the value stored in the mode position memory at the time of the previous mode setting is obtained and a specified number of pulses are output to the drive circuit 3A to drive the mode switch door 13 in a ventilation direction. Thus, the mode switch door 13 is set to a ventilation mode and VENT position information is stored in the mode position memory.

However, when the stepping motor actuator 4A is used as described above, if some abnormality occurs in the control unit 1A, the position control of the mode switch door 13 cannot be performed. The abnormality is, for example, that the CPU of the microcomputer 2A runs recklessly or is reset or that a target position is different from a position calculated from data stored in the mode position memory during the stoppage of the stepping motor actuator 4A for some reason or other.

In the third embodiment of the present invention, when some abnormality occurs in the control unit 1A, the same processing shown in FIG. 9 as that of FIG. 3 is carried out. However, since control is carried out according to drive pulses and not drive times in this embodiment, fault compensation control is carried out according to pulses X1, X2 and X3 in place of drive times T1, T2 and T3.

In step S1A, it is judged whether or not the control unit 1A is out of order. When it is judged to be not out of order, regular control as shown in FIGS. 7 and 8 is carried out.

When it is judged to be out of order according to an output from the abnormality control means 2X and the position of the mode switch door 13 is set to either one of defrost, defrost/foot, foot, bilevel and ventilation modes by the operation of the mode changing switch 6, it is first judged in step S2A whether or not the defrost switch 7 is turned on. When it is turned on, a pulse is output for a predetermined time to drive the mode switch door 13 in a defrost direction. Thus, the mode switch door 13 is set to a defrost mode.

When the defrost switch 7 is not turned on, the routine proceeds to step S3A in which it is judged whether or not the defrost/foot switch 8 is turned on. When it is turned on, a pulse is output for a predetermined time to drive the mode switch door 13 in a defrost direction and then a predetermined number X1 of pulses are output to drive the mode switch door 13 in a ventilation direction. Thus, the mode switch door 13 is set to a defrost/foot mode.

When the defrost/foot switch 8 is not turned on, the routine proceeds to step S4A in which it is judged whether or not the foot switch 9 is turned on. When it is turned on, a pulse is output for a predetermined time to drive the mode switch door 13 in a defrost direction and then a predetermined number X2 of pulses are output to drive the mode switch door 13 in a ventilation direction. Thus, the mode switch door 13 is set to a foot mode. In this case, after a pulse is output for a predetermined time to drive the mode switch door 13 in a ventilation direction, a predetermined number X2' of pulses may be output to drive the mode switch door 13 in a defrost direction.

When the foot switch 9 is not turned on, the routine proceeds to step S5A in which it is judged whether or not the bilevel switch 10 is turned on. When it is turned on, a pulse is output for a predetermined time to drive the mode switch door 13 in a ventilation direction and then a predetermined number X3 of pulses are output to drive the mode switch door 13 in a defrost direction. Thus, the mode switch door 13 is set to a bilevel mode.

When the bilevel switch 10 is not turned on, the routine proceeds to step S6A in which it is judged whether or not the ventilation switch 11 is turned on. When it is turned on, a pulse is output for a predetermined time to drive the mode switch door 13 in a ventilation direction. Thus, the mode switch door 13 is set to a ventilation mode position.

When the abnormality in the control unit in the above step S1A is that the CPU of the microcomputer 2A is reset or that the target position is different from a position calculated from data stored in the mode position memory as described above, the previous value stored in the mode position memory cannot be used. Therefore, the CPU cannot carry out control with reference to the value stored in the mode position memory. In the case of such abnormality, when the above abnormality is detected by the abnormality detection means 2A, a processing program for carrying out the processing of FIG. 9 may be loaded onto the CPU of the microcomputer 2A to control the drive circuit 3A. After compensation control is carried out through steps S2A to S6A of FIG. 9, when the compensated position is stored in the mode position memory, regular control can be carried out with reference to the mode position memory from the next time.

In the constitution of FIG. 6, the microcomputer 2A for carrying out the fault compensation control of FIG. 9 serves as compensation processing means.

Figure 10:
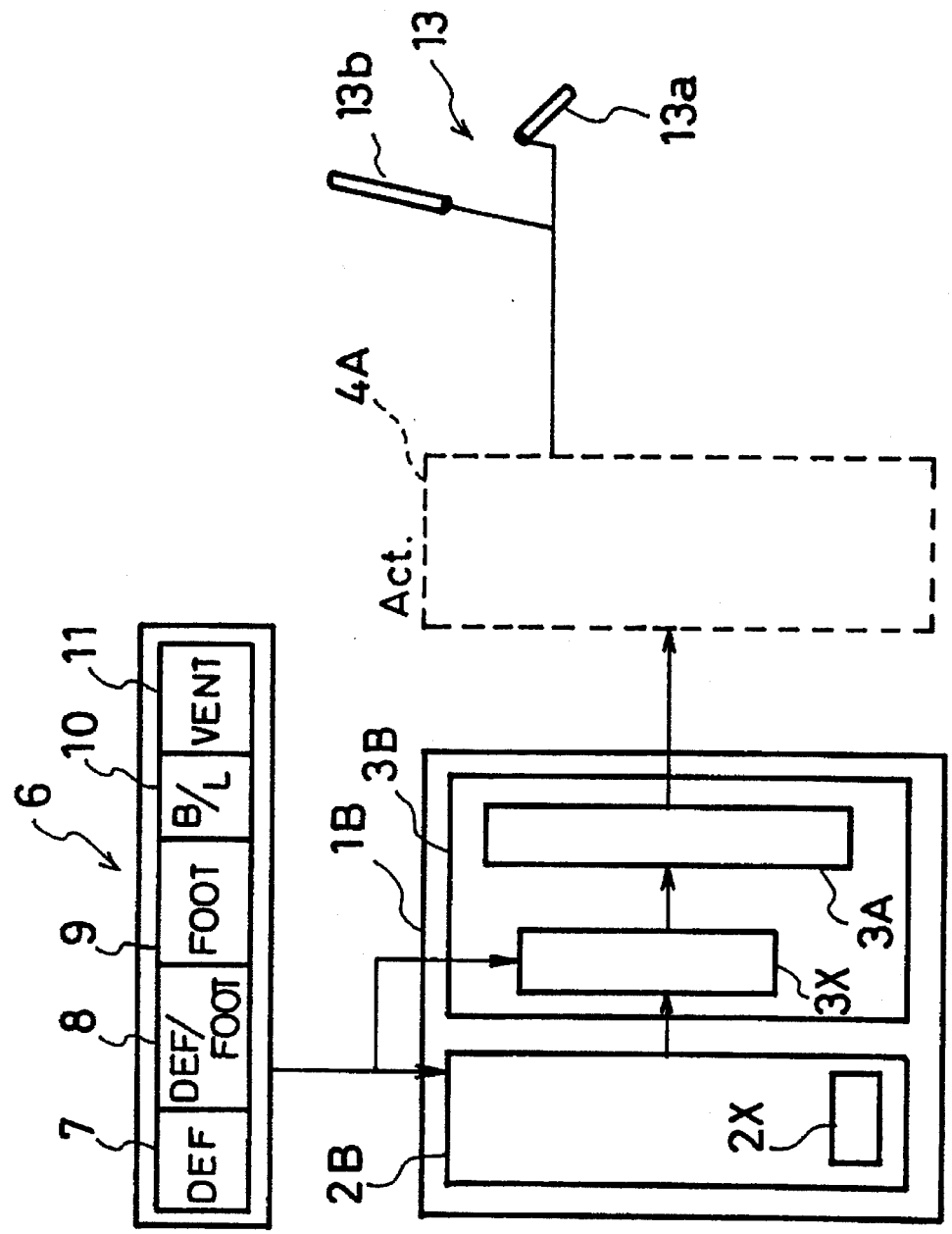
FIG. 10 is a block diagram of the third embodiment of the present invention.

When a control unit 1B is constituted as shown in FIG. 10, even if abnormality in the control unit is a reckless run of the CPU of the microcomputer 2B, the processing of FIG. 9 can be performed.

In FIG. 10, denoted at 1B is a control unit which consists of the microcomputer 2B and drive control means 3B. The drive control means 3B comprises a drive circuit 3A similar to the drive circuit of FIG. 6 and an arithmetic processing unit 3X as compensation processing means. In this case, the microcomputer 2B which instructs only normal or reverse rotation of the rotor 4X is used and what actually controls the drive circuit 3A is the arithmetic processing unit 3X. Therefore, the arithmetic processing unit 3X does not judge whether the rotor 4X should be rotated normally or reversely, but has the same functions as those of the above microcomputer 2A as shown in FIG. 6.

In the case of the above constitution, when the CPU of the microcomputer 2B runs recklessly, an instruction for rotating the rotor 4X normally or reversely is not provided from the microcomputer 2B to the arithmetic processing unit 3X. However, when the reckless run of the CPU is detected by the abnormality detection means 2X, a processing program for carrying out the processing of FIG. 9 may be loaded onto the arithmetic processing unit 3X. Thereby, even if the CPU of the microcomputer 2B runs recklessly, the arithmetic processing unit 3X can control the drive circuit 3A in accordance with the processing of FIG. 9 based on an instruction from the mode changing switch 6 and hence, fault compensation control can be carried out at the time of a reckless run of the CPU.

In FIG. 10, an output from the mode changing switch 6 is applied to the arithmetic processing unit 3X. In fact, when the abnormality detection means 2X detects abnormality, a bypass switch may be directly controlled to apply the output from the mode changing switch 6 to the arithmetic processing unit 3X, bypassing the CPU of the microcomputer 2B.

In the constitution of FIG. 10, when the CPU of the microcomputer 2B is reset (in this case, an instruction for rotating the rotor 4X normally or reversely is not provided from the microcomputer 2B until the initialization of the CPU is completed), when the target position is different from a position calculated from data stored in the mode position memory (which is controlled by the arithmetic processing unit 3X in FIG. 10) (in this case, the arithmetic processing unit 3X cannot carry out position control with reference to the mode position memory), or when other abnormality occurs, it is needless to say that fault compensation control can be carried out by loading a processing program for carrying out the processing of FIG. 9 onto the arithmetic processing unit 3X and controlling the drive circuit 3A.

According to the third embodiment of the present invention, even when the stepping motor actuator 4A is used, if some abnormality occurs in the control unit for controlling the stepping motor actuator 4A, the same effect as those of the first and second embodiments can be obtained.

What is claimed is:

1. A fault compensation method for an air conditioner comprising an actuator which drives a mode switch door and which has a setting unit including contacts for setting the mode switch door to any one of at least ventilation mode, bilevel mode, foot mode and defrost mode positions and a control unit which drives the actuator according to the operation of a mode changing switch and stops at a position set by the setting unit, wherein upon the occurrence of a fault in the setting unit, another mode position can be set by moving the actuator to a ventilation mode position or a defrost mode position and by reversing it for a predetermined time with the moved position as a starting point.

2. A fault compensation method for an air conditioner comprising an actuator which drives a mode switch door and which has a setting unit including contacts for setting the mode switch door to any one of at least ventilation mode, bilevel mode, foot mode, defrost/foot mode and defrost mode positions and a control unit which drives the actuator according to the operation of a mode changing switch and stops at a position set by the setting unit, wherein upon the occurrence of a fault in the setting unit, when a defrost switch is operated, the actuator is moved to a defrost mode position, when a foot switch is operated, the actuator is moved to the defrost mode position and then reversed in a predetermined section, when a defrost/foot switch is operated, the actuator is moved to the defrost mode position and then reversed in a section shorter than the above reverse section when the foot switch is operated, when a ventilation switch is operated, the actuator is moved to a ventilation mode position, and when a bilevel switch is operated, the actuator is moved to the ventilation mode position and then reversed in a predetermined section.

3. A fault compensation method for an air conditioner according to claim 1 or 2, wherein a reversing time is set in advance according to a drive voltage of a motor of the actuator so that the actuator is reversed only for this time.

4. A fault compensation method for an air conditioner comprising a stepping motor actuator for driving a mode switch door and a control unit for driving and controlling the stepping motor actuator according to the operation of a mode changing switch so that the mode switch door is set to a desired position out of at least ventilation mode, bilevel mode, foot mode and defrost mode positions, wherein upon the occurrence of abnormality in the control unit, another mode position can be set by moving the stepping motor actuator to a ventilation mode position or a defrost mode position and by reversing it with the moved position as a starting point.

5. A fault compensation method for an air conditioner comprising a stepping motor actuator for driving a mode switch door and a control unit for driving and controlling the stepping motor actuator according to the operation of a mode changing switch so that the mode switch door is set to a desired position out of at least ventilation mode, bilevel mode, foot mode and defrost mode positions, wherein upon the occurrence of abnormality in the control unit, when a defrost switch is operated, the stepping motor actuator is moved to a defrost mode position, when a foot switch is operated, the stepping motor actuator is moved to the defrost mode position and then reversed in a predetermined section, when a defrost/foot switch is operated, the stepping motor actuator is moved to the defrost mode position and then reversed in a section shorter than the above reverse section when the foot switch is operated, when a ventilation switch is operated, the stepping motor actuator is moved to a ventilation mode position, and when a bilevel switch is operated, the stepping motor actuator is moved to the ventilation mode position and then reversed in a predetermined section.

6. A fault compensation apparatus for an air conditioner comprising a stepping motor actuator for driving a mode switch door, a mode changing switch, and a control unit for driving and controlling the stepping motor actuator according to the operation of the mode changing switch so that the mode switch door is set to a desired position out of at least ventilation mode, bilevel mode, foot mode and defrost mode positions, wherein the control unit comprises drive means for driving the stepping motor actuator, abnormality detection means for detecting abnormality in the control unit, and compensation processing means for controlling the drive means so that another mode position can be set by moving the stepping motor actuator to a ventilation mode position or a defrost mode position and reversing it for a predetermined time with the moved position as a starting point when abnormality is detected by the abnormality detection means.

7. A fault compensation apparatus for an air conditioner comprising a stepping motor actuator for driving a mode switch door, a mode changing switch, and a control unit for driving and controlling the stepping motor actuator according to the operation of the mode changing switch so that the mode switch door is set to a desired position out of at least ventilation mode, bilevel mode, foot mode and defrost mode positions, wherein the control unit comprises drive means for driving the stepping motor actuator, abnormality detection means for detecting abnormality in the control unit, and compensation processing means for controlling the drive means in such a manner that, in the case that abnormality is detected by the abnormality detection means, when a defrost switch is operated, the stepping motor actuator is moved to a defrost mode position, when a foot switch is operated, the stepping motor actuator is moved to the defrost mode position and then reversed in a predetermined section, when a defrost/foot switch is operated, the stepping motor actuator is moved to the defrost mode position and then reversed in a section shorter than the above reverse section when the foot switch is operated, when a ventilation switch is operated, the stepping motor actuator is moved to a ventilation mode position, and when a bilevel switch is operated, the stepping motor actuator is moved to the ventilation mode position and then reversed in a predetermined section.

8. A fault compensation apparatus for an air conditioner according to claim 6 or 7, wherein the compensation processing means is formed of a microcomputer.

9. A fault compensation apparatus for an air conditioner according to claim 6 or 7, wherein the control unit has a microcomputer which instructs normal or reverse rotation of the stepping motor actuator and the compensation processing means is formed of an arithmetic processing unit for controlling the drive means based on an instruction from the microcomputer.

10. A fault compensation apparatus for an air conditioner according to claim 8, wherein abnormality in the control unit is that a CPU of the microcomputer is reset.

11. A fault compensation apparatus for an air conditioner according to claim 9, wherein abnormality in the control unit is a reckless run of a CPU of the microcomputer.

12. A fault compensation apparatus for an air conditioner according to claim 6 or 7, wherein the drive means is formed of switching FETs.

13. A fault compensation apparatus for an air conditioner according to claim 6 or 7, wherein the control unit comprises a mode position memory and controls the drive means with reference to the mode position memory.

14. A fault compensation apparatus for an air conditioner according to claim 13, wherein abnormality in the control unit is that a target position of the mode switch door is different from a position calculated from data stored in the mode position memory during the stoppage of the stepping motor actuator.

* * * * *